United States Patent
Chen et al.

(10) Patent No.: US 11,158,142 B2
(45) Date of Patent: Oct. 26, 2021

(54) METHOD FOR TIRE FORCE RESERVE ESTIMATION

(71) Applicant: Hua-chuang Automobile Information Technical Center Co., Ltd., New Taipei (TW)

(72) Inventors: Bo-Chiuan Chen, New Taipei (TW); Ya-Yu You, New Taipei (TW); Yu-Min Lin, New Taipei (TW); Wei-Jie Chen, New Taipei (TW); Yuan-Chun Chen, New Taipei (TW); Di Ku, New Taipei (TW)

(73) Assignee: HUA-CHUANG AUTOMOBILE INFORMATION TECHNICAL CENTER CO., LTD., New Taipei (TW)

( * ) Notice: Subject to any disclaimer, the term of this patent is extended or adjusted under 35 U.S.C. 154(b) by 455 days.

(21) Appl. No.: 16/212,996

(22) Filed: Dec. 7, 2018

(65) Prior Publication Data
US 2020/0151970 A1    May 14, 2020

(30) Foreign Application Priority Data

Nov. 9, 2018   (CN) .......................... 201811332457.7

(51) Int. Cl.
*G07C 5/08*   (2006.01)
*G01L 5/13*   (2006.01)
*B60Q 5/00*   (2006.01)

(52) U.S. Cl.
CPC ........... *G07C 5/0808* (2013.01); *B60Q 5/005* (2013.01); *G01L 5/13* (2013.01)

(58) Field of Classification Search
None
See application file for complete search history.

(56) References Cited

U.S. PATENT DOCUMENTS

| | | | | |
|---|---|---|---|---|
| 5,070,459 A | * | 12/1991 | Zanten | B60T 8/17616 701/78 |
| 6,549,842 B1 | * | 4/2003 | Hac | B60T 8/172 303/149 |
| 2007/0050121 A1 | * | 3/2007 | Ammon | B60W 40/12 701/80 |
| 2010/0207447 A1 | * | 8/2010 | Joyce | B60T 8/48 303/160 |
| 2013/0018562 A1 | * | 1/2013 | Nakai | B60W 50/0097 701/93 |
| 2017/0210414 A1 | * | 7/2017 | Sato | B62D 6/003 |

* cited by examiner

*Primary Examiner* — Nicholas K Wiltey
(74) *Attorney, Agent, or Firm* — Muncy, Geissler, Olds & Lowe, P.C.

(57) ABSTRACT

A method for tire force reserve estimation is applicable to a vehicle. In the method, vehicle motion information including the longitudinal acceleration, the lateral acceleration, the change of the tire rotation angle at different times, the change of the yaw at different times, the steering angle of the steering tires, etc. is continuously detected, for estimating the current normal force, the current longitudinal force and the current lateral force of each of the tires. Finally, the current normal force, the current longitudinal force, the current lateral force and the coefficient of friction of the road relative to the tires are applied to estimate the longitudinal tire force reserve and the lateral tire force reserve.

9 Claims, 10 Drawing Sheets

| Parameter | Symbol | Value(unit) |
|---|---|---|
| Vehicle body mass | $m$ | $1800 kg$ |
| Tire mass | $m_u$ | $100 kg$ |
| Distance between the center of gravity and the front shaft | $l_f$ | $1.35 m$ |
| Distance between the center of gravity and the rear shaft | $l_r$ | $1.65 m$ |
| Distance between the right and left tires | $d$ | $1.64 m$ |
| Height | $h_s$ | $0.7 m$ |
| Effective rolling radius of the tire | $r_w$ | $0.346 m$ |
| Moment of inertia of the tire | $I_w$ | $0.9 kg-m^2$ |

FIG. 4

METHOD FOR TIRE FORCE RESERVE ESTIMATION

CROSS-REFERENCE TO RELATED APPLICATION

This non-provisional application claims priority under 35 U.S.C. § 119(a) to Patent Application No. 201811332457.7 filed in China, P.R.C. on Nov. 9, 2018, the entire contents of which are hereby incorporated by reference.

BACKGROUND

Technical Field

The instant disclosure relates to a monitoring technique for car dynamics, in particular, to a method for tire force reserve estimation.

Related Art

During a turning, a vehicle needs a lateral tire force to keep the vehicle within the lane, so that the vehicle is not deviated off the lane by the centrifugal force. In this moment, a part of the tire force is used as the lateral force, so that the longitudinal tire force reserve decreases. As a result, the vehicle may possibly have situations like tire slippage or tire idling. Furthermore, in a turning lane, the vehicle needs more lateral tire force coping with various road conditions during acceleration or deceleration. In this moment, the longitudinal force should be decreased to increase the lateral force for coping with the road conditions; otherwise, the vehicle may have tire slippage or drifting. An advanced driver assistance systems (ADAS) known to the inventor delivers an alarm and starts to adjust the tire force allocation (including intervening into the vehicle brake system to decelerate each of the tires by braking or reallocating the output torque of each of the tires) when the ADAS already senses the tire slipping condition.

SUMMARY

If the residual maximum available tire force (including the longitudinal tire force and the lateral tire force) can be estimated, the ADAS can deliver the alarm in advance; the ADAS may even intervene to control each of the tires to prevent the tire from slipping. The estimation may be applied to an automatic driving system. Therefore, the automatic driving system can control the vehicle in a fierce manner (which means to make a turn rapidly or to change the lane rapidly) under a sufficient amount of residual maximum available tire force.

In view of these, in one embodiment, a method for tire force reserve estimation is provided, and the method can be used to estimate the tire force reserve of each of the tires by detecting the dynamic information of the vehicle.

In one embodiment, the method for tire force reserve estimation is applicable to estimate a tire force reserve of a vehicle. The vehicle has a vehicle body mass, a center of gravity and a plurality of tires. The plurality tires of the vehicle comprise at least a pair of steering tires. A height is defined between the center of gravity and a road. A rolling direction of each of the tires is defined as a longitudinal direction, and a direction perpendicular to the rolling direction on a horizontal plane is defined as a lateral direction. The method comprises obtaining an initial normal force of each of the tires to the road; obtaining a longitudinal load transfer of each of the tires and lateral load transfer of each of the tires according to a longitudinal acceleration of the vehicle, a lateral acceleration of the vehicle, the vehicle body mass, a tire mass of each of the tires, a relative position between each of the tires and the center of gravity; correcting the initial normal force of each of the tires according to the longitudinal load transfer of each of the tires and the lateral load transfer of each of the tires to obtain a current normal force of each of the tires; obtaining a current longitudinal force of each of the tires according to a tire rotational speed of each of the tires, a tire torque of each of the tires, an effective rolling radius of each of the tires, a moment of inertia of each of the tires and time rate of change of tire rotation angles of each of the tires; obtaining an overall lateral force of the plurality tires of the vehicle according to the lateral acceleration of the vehicle, a yaw acceleration of the vehicle, a steering angle of each of the steering tires relative to the longitudinal direction, the current longitudinal force of each of the tires and the current normal force of each of the tires; obtaining a current lateral force of each of the tires; and obtaining a longitudinal tire force reserve of each of the tires and a lateral tire force reserve of each of the tires according to the current normal force of each of the tires, a coefficient of friction of the road relative to each of the tires, the current longitudinal force of each of the tires and the current lateral force of each of the tires.

As above, according to one or some embodiments of the instant disclosure, the method for tire force reserve estimation can be utilized to estimate the longitudinal tire force reserve of each of the tires and the lateral tire force reserve of each of the tires in an effective manner. When the tire force reserve is not enough, the system can deliver the warning to the driver so that the driver can adjust the manipulation for the vehicle. Even more, this method allows the ADAS to intervene the manipulation of the vehicle before the vehicle tires slip, so that the driving safety can be improved effectively. The method for tire force reserve estimation can be further applied to an automatic driving system to estimate the driving strategy of the automatic driving system. Hence, the method can prevent the automatic driving system from making decisions that may cause tire slipping.

BRIEF DESCRIPTION OF THE DRAWINGS

The disclosure will become more fully understood from the detailed description given herein below for illustration only, and thus not limitative of the disclosure, wherein:

FIG. 4 illustrates a vehicle parameter table for tire force reserve estimation;

DETAILED DESCRIPTION

Figure 1:
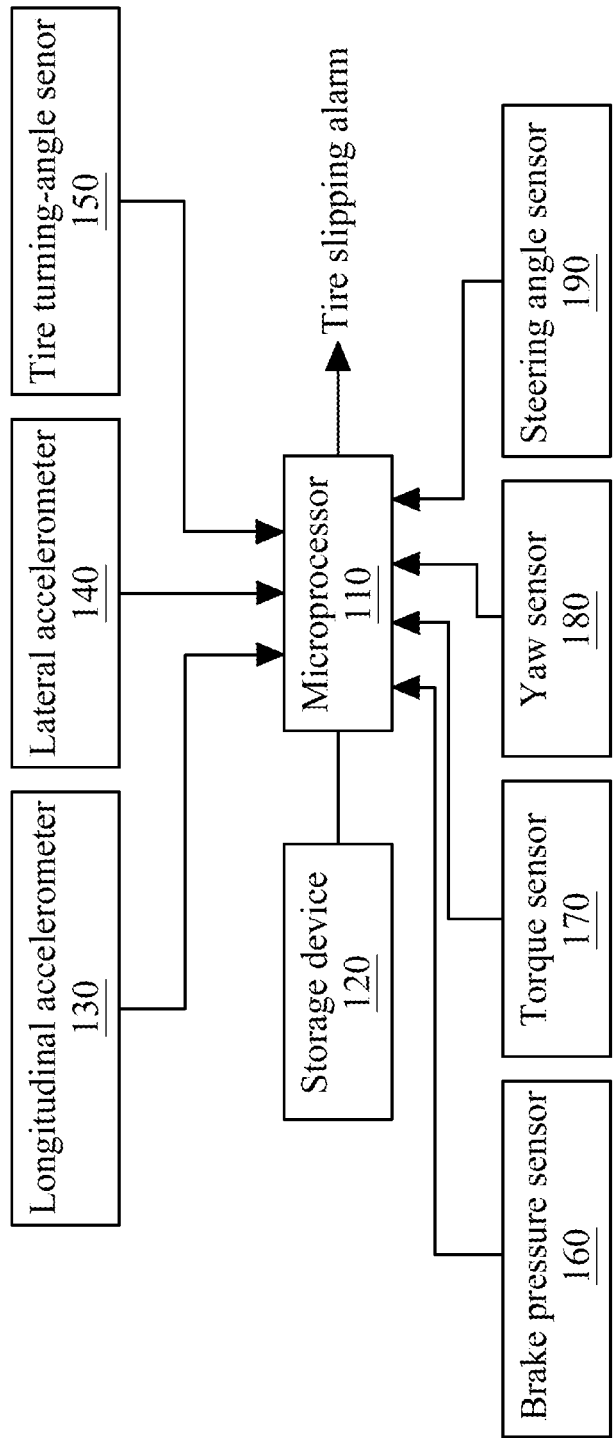
FIG. 1 illustrates a systematic block diagram of a vehicle control system adapted to execute a method for tire force reserve estimation according to an exemplary embodiment of the instant disclosure.

Please refer to FIG. 1, illustrating a vehicle control system adapted to execute a method for tire force reserve estimation, so that the vehicle control system can perform the turning of the vehicle under a safe condition. The vehicle control system comprises a microprocessor 110, a storage device 120, a longitudinal accelerometer 130, a lateral accelerometer 140, a tire turning-angle senor 150, a brake pressure sensor 160, a torque sensor 170, a yaw sensor 180 and a steering angle sensor 190.

Figure 2:
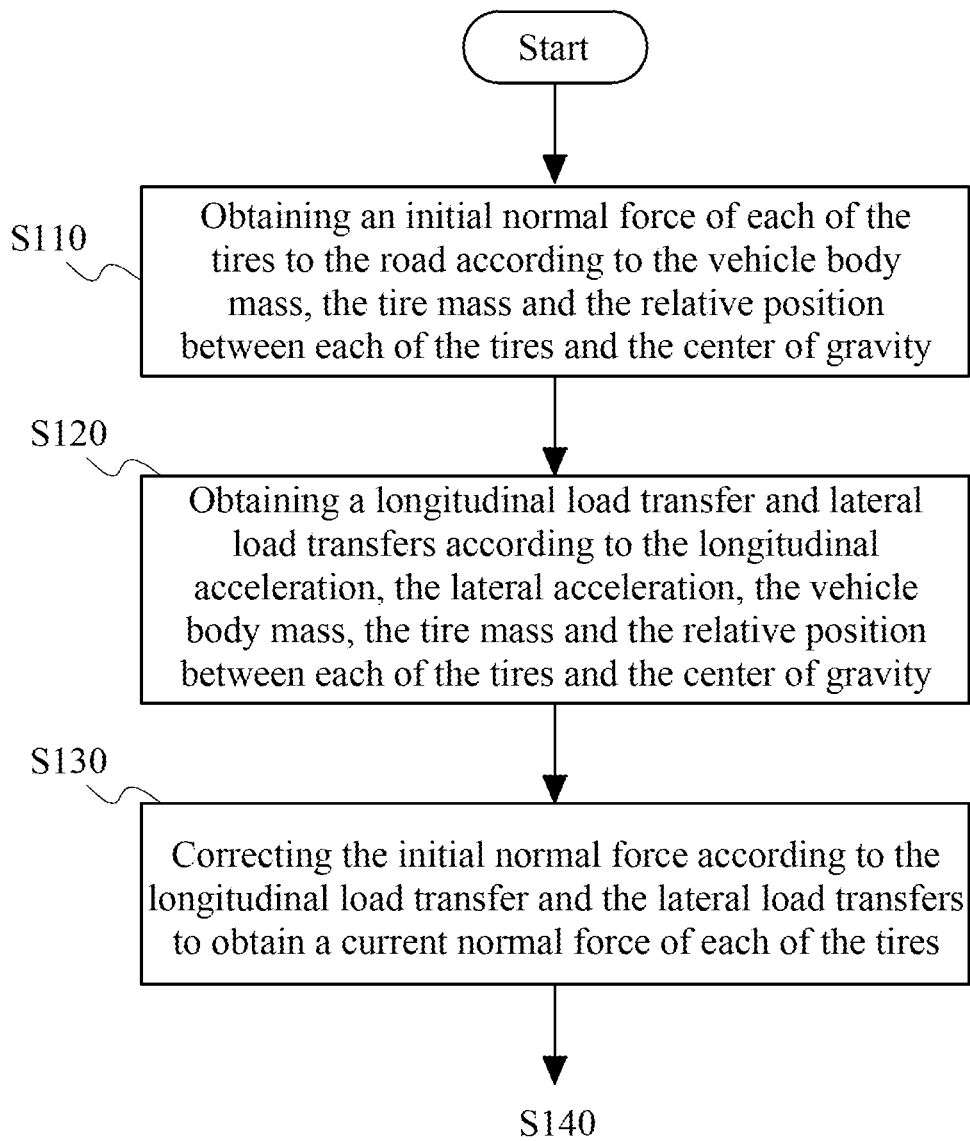
FIGS. 2 and 3 illustrate flowcharts of the method for tire force reserve estimation of the exemplary embodiment.

Please refer to FIGS. 1 and 2, according to the above vehicle control system, an embodiment of the instant disclosure provides a method for tire force reserve estimation for estimating the tire force reserve of a vehicle to prevent the tire slippery during the turning of the vehicle. The vehicle has a vehicle body mass $m_s$, a center of gravity and a plurality of tires. The vehicle body mass $m_s$ and the position of the center of gravity may be obtained from measurement or from the vehicle specification. In general, the vehicle has four tires, respectively, the front right tire fr, the front left tire fl, the rear right tire rr and the rear left tire rl. The front right tire fr and the front left tire fl are usually provided as a pair of steering tires of the vehicle. Each of the tires has a tire mass $m_u$ and an effective rolling radius $r_w$, so that a moment of inertia $I_w$ of each of the tires can be calculated. The method may be applied to the four tires to determine the tire force reserve for each of the tires.

The term "tire force reserve" indicates a difference between the horizontal force borne by the tire and the maximum tire force of the tire applied to road. The maximum tire force of the tire applied to the ground (i.e., the maximum tire force the tire can provide) has to be greater than a current tire force (i.e., the horizontal force borne by the tire, including longitudinal force $\hat{F}_{x,i}$ and lateral force $\hat{F}_{y,i}$) to prevent the tire slippage.

A height $h_s$ is defined between the center of gravity and the road. A rolling direction of the tires is defined as a longitudinal direction, and a direction perpendicular to the rolling direction on a horizontal plane is defined as a lateral direction.

Firstly, the microprocessor 110 obtains the initial normal force $F_{zs,i}$ of each of the tires to the road according to the vehicle body mass $m_s$, the tire mass $m_u$ and the relative position between each of the tires and the center of gravity, as shown in the step S110.

In the initial normal force $F_{zs,i}$ the symbol i respectively stands for the four tires fr, fl, rr and rl. The normal force $F_{zs,i}$ indicates a vertical load of the vehicle to each of the tires. The vehicle body mass $m_s$, the tire mass $m_u$ and the relative position between each of the tires and the center of gravity, are typically fixed values. Therefore, after a one-time calculation, the microprocessor 110 obtains the initial normal force $F_{zs,i}$ of each of the tires and stores the initial normal force $F_{zs,i}$ of each of the tires in the storage device 120. Consequently, when the microprocessor 110 executes the method again, the microprocessor 110 can load the initial normal force $F_{zs,i}$ from the storage device 120 without a repeated calculation. Even more, the vehicle body mass $m_s$, the tire mass $m_u$ and the relative position between each of the tires and the center of gravity can be obtained externally, for example, such information may be downloaded from a database according to the model of the vehicle and stored in the storage device 120.

According to the moving dynamics of the vehicle, the longitudinal accelerometer 130 and the lateral accelerometer 140 continue detecting the longitudinal acceleration $a_x$ and the lateral acceleration $a_y$ of the vehicle. Under the moving dynamics of the vehicle, the normal force of each of the tires to ground is not the initial normal force $F_{zs,i}$ anymore; instead, each of the tires is affected by the acceleration of the vehicle to have load transfers. Therefore, the microprocessor then obtains a longitudinal load transfer $W_x$ and lateral load transfers $W_{yf}$ and $W_{yr}$ according to the longitudinal acceleration $a_x$, the lateral acceleration $a_y$, the vehicle body mass $m_s$, the tire mass $m_u$ and the relative position between each of the tires and the center of gravity, as shown in the step S120. The estimation of the longitudinal load transfer $W_x$ and the lateral load transfers $W_{yf}$ and $W_{yr}$ are described as following.

$$W_{yf} = \frac{(m_s h_s + 4 m_u r_w) l_r}{dL} a_y \quad (1)$$

$$W_{yr} = \frac{(m_s h_s + 4 m_u r_w) l_f}{dL} a_y \quad (2)$$

-continued $$W_x = \frac{m_s h_s}{2L} a_x \quad (3)$$

Wherein, L is the distance between the front shaft and the rear shaft of the vehicle, $m_u$ is the tire mass of each of the tires, $l_f$ is the distance between the center of gravity of the vehicle and the front shaft, and $l_r$ is the distance between the center of gravity of the vehicle and the rear shaft.

With the longitudinal load transfer $W_x$ and the lateral load transfers $W_{yf}$ and $W_{yr}$, the microprocessor 110 then corrects the initial normal force $F_{zs,i}$ according to the longitudinal load transfer $W_x$ and the lateral load transfers $W_{yf}$ and $W_{yr}$ to obtain a current normal force $\hat{F}_{z,i}$ of each of the tires, as shown in the step S130.

$$\hat{F}_{z,fl} = F_{zs,fl} - W_{yf} - W_x \quad (4)$$

$$\hat{F}_{z,fr} = F_{zs,fr} + W_{yf} - W_x \quad (5)$$

$$\hat{F}_{z,rl} = F_{zs,rl} - W_{yr} + W_x \quad (6)$$

$$\hat{F}_{z,rr} = F_{zs,rr} + W_{yr} + W_x \quad (7)$$

Wherein, the symbol i respectively stands for the four tires fr, fl, rr and rl.

In general, the longitudinal force $\hat{F}_{x,i}$ of the tire is related to the rotation dynamics of the tire. The rotation parameter of the tire includes the tire rotational speed $\omega_w$, the tire angular acceleration $\dot{\omega}_w$ and the tire torque $T_w$. The microprocessor 110 obtains the tire rotation angle $\theta_w$ and the tire rotational speed $\omega_w$ through the tire turning-angle sensor 150 and further obtains the tire angular acceleration $\dot{\omega}_w$ according to the time rate of change of tire rotation angles $\theta_w$ (that is, the change of the tire rotation angles $\theta_w$ at different times).

$$\dot{\theta}_w = \omega_w \quad (8)$$

The torque balance equation related to the current longitudinal force $\hat{F}_{x,i}$ can be obtained by combining the tire angular acceleration $\dot{\omega}_w$, the effective rolling radius $r_w$ and the moment of inertia $I_w$.

$$\dot{\omega}_w = \frac{(T_w - r_w F_x)}{I_w} \quad (9)$$

The tire torque $T_w$ comprises a brake torque $T_b$ and a drive torque $T_t$. After the microprocessor 110 obtains the brake pressure through the brake pressure sensor 160, the microprocessor 110 calculates the brake torque $T_b$ according to the brake specification. On the other hand, the drive torque $T_t$ may be obtained by measuring the torque output of the vehicle power system to each of the tires through the torque sensor 170.

$$T_w = T_t + T_b \quad (10)$$

The tire torque $T_w$ may be obtained by measuring the tire with a single torque sensor device. With the above data, the current longitudinal force $\hat{F}_{x,i}$ can be estimated. In the estimation, the state vector is defined as $x_{Fx} = [\theta_w \; \omega_w \; F_x]^T$, the input signal is $u_{Fx} = T_w$, and the output signal is $y_{Fx} = \theta_w$. Therefore, these equations can be rewritten as equations (11), (12) and (13):

$$\dot{x}_{Fx} = A_{Fx} x_{Fx} + B_{Fx} u_{Fx} \quad (11)$$

$$y_{Fx} = C_{Fx} x_{Fx} \quad (12)$$

$$A_{Fx} = \begin{bmatrix} 0 & 1 & 0 \\ 0 & 0 & -\frac{r_w}{I_w} \\ 0 & 0 & 0 \end{bmatrix}, B_{Fx} = \begin{bmatrix} 0 \\ \frac{1}{I_w} \\ 0 \end{bmatrix}^T, C_{Fx} = \begin{bmatrix} 1 \\ 0 \\ 0 \end{bmatrix} \quad (13)$$

Wherein, $A_{Fx}$ is the system matrix, $B_{Fx}$ is the input vector, and $C_{Fx}$ is the output vector.

Next, the state-space motion model under continuous time duration is converted into a state-space equation under discrete times, and the feedback gain is obtained via the Kalman filter. The converted equation (14) is provided as following, and the current longitudinal force of each of the four tires $\hat{F}_{x,fl}$, $\hat{F}_{x,fr}$, $\hat{F}_{x,rl}$ and $\hat{F}_{x,rr}$ are calculated through the Kalman detector:

$$\hat{x}_{x,k+1} = \Phi_x \hat{x}_{x,k} + \Gamma_x u_{x,k} + L_x(y_{x,k} - H_x \hat{x}_{x,k}) \quad (14)$$

$$\Phi_x = \begin{bmatrix} 1 & T & 0 \\ 0 & 0 & -\frac{r_w}{I_w}T \\ 0 & 0 & 1 \end{bmatrix}, \Gamma_x = \begin{bmatrix} 0 \\ \frac{T}{I_w} \\ 0 \end{bmatrix} \quad (15)$$

Figure 3:
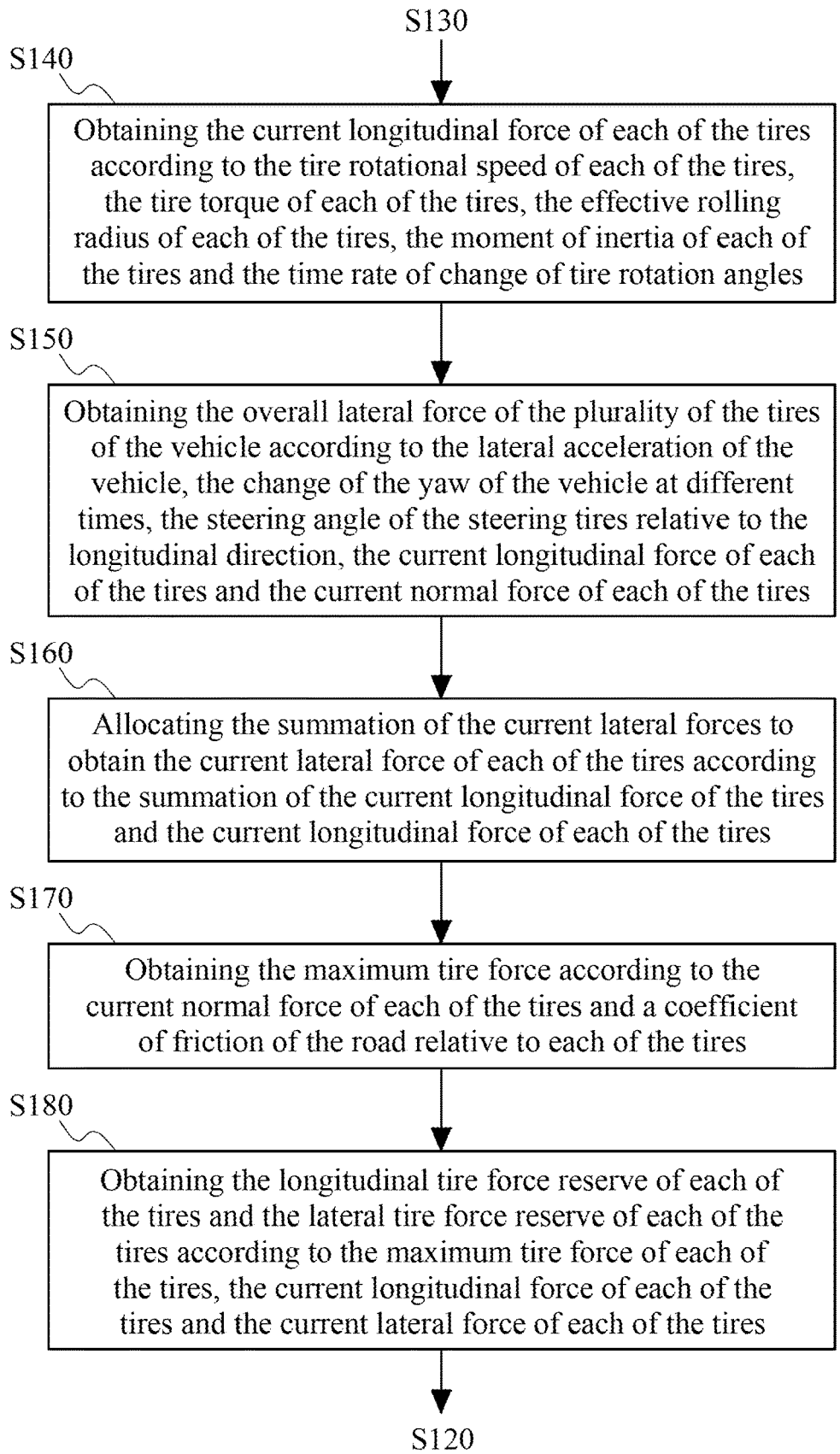

As shown in FIG. 3, the effective rolling radius $r_w$ and the moment of inertia $I_w$ of each of the tires may be calculated in advance, or may be downloaded from the database according to the model of the vehicle and stored in the storage device 120. Such information may be loaded when the microprocessor 110 requires. Therefore, after the tire rotational speed $\omega_w$, the tire torque $T_w$ and the time rate of change of tire rotation angles $\theta_w$ are obtained, the microprocessor 110 can obtain the current longitudinal force $\hat{F}_{x,i}$ of each of the tires according to the tire rotational speed $\omega_w$ of each of the tires, the tire torque $T_w$ of each of the tires, the effective rolling radius $r_w$ of each of the tires, the moment of inertia $I_w$ of each of the tires and the time rate of change of tire rotation angles $\theta_w$ (that is, the change of the tire rotation angles $\theta_w$ at different times), as shown in the step S140.

In order to obtain the current lateral force $\hat{F}_{y,i}$ of each of the tires, the overall lateral force to the plurality tires of the vehicle (the summation of the lateral forces of the vehicle applied to the tires) is obtained through the lateral dynamics of the vehicle. The yaw sensor 180 continuously detects the yaw r of the vehicle, and the steering angle sensor 190 continuously detects the steering angle δ of the steering tires relative to the longitudinal direction. The microprocessor 110 obtains the overall lateral force of the plurality tires of the vehicle according to the lateral acceleration $a_y$ of the vehicle, the change of the yaw r of the vehicle at different times, the steering angle δ of the steering tires relative to the longitudinal direction, the current longitudinal force $\hat{F}_{x,i}$ of each of the tires and the current normal force $\hat{F}_{z,i}$ of each of the tires, as shown in the step S150. Wherein, the change of the yaw r at different times is used to calculate the yaw rate $\dot{r}$ for the further calculation of the yaw acceleration $\ddot{r}$.

The calculation of the overall lateral force may be obtained by constructing a simultaneous equation under the force balance condition:

$$m_s a_y = \hat{F}_{x,fl}\sin\delta + \hat{F}_{x,fr}\sin\delta + F_{yf}\cos\delta + F_{yr} \quad (16)$$

$$I_z \dot{r} = l_f \cos\delta - l_f F_{yr} + \\ \frac{d}{2}(-\hat{F}_{x,fl}\cos\delta + \hat{F}_{x,fr}\cos\delta + \hat{F}_{x,rl} + \hat{F}_{x,rr}) + l_f(\hat{F}_{x,fl} + \hat{F}_{x,fr})\sin\delta \quad (17)$$

Next, the simultaneous equation is simplified as equations (18) and (19), and the values of the parameters can be substituted into the equations.

$$\hat{F}_{yr} = \frac{I_z \dot{r} + l_r m_s a_y + \frac{d}{2}(-\hat{F}_{x,fl}\cos\delta + \hat{F}_{x,fr}\cos\delta - \hat{F}_{x,rl} + \hat{F}_{x,rr})}{L\cos\delta} \quad (18)$$

$$\hat{F}_{yr} = \frac{-I_z \dot{r} + l_r m_s a_y + \frac{d}{2}(-\hat{F}_{x,fl}\cos\delta + \hat{F}_{x,fr}\cos\delta - \hat{F}_{x,rl} + \hat{F}_{x,rr})}{L} \quad (19)$$

The yaw acceleration $\ddot{r}$ may be estimated by using the yaw rate $\dot{r}$ with the Kalman detector. The relationship between the yaw r, the yaw rate $\dot{r}$, and the yaw acceleration $\ddot{r}$ is as the equation below.

$$\frac{dr}{dt} = \dot{r}, \frac{d\dot{r}}{dt} = \ddot{r} \quad (20)$$

From the foregoing equations, the state-space representation under continuous time duration can be obtained, as the equation (21).

$$\dot{X}_r = A_r x_r + B_r u_r \quad (21)$$

$$A_r = \begin{bmatrix} 0 & 1 \\ 0 & 0 \end{bmatrix}^T, B_r = \begin{bmatrix} 0 \\ 1 \end{bmatrix} \quad (22)$$

Wherein, $x_{r,k}=[r_k \ \dot{r}_k]^T$ is the state vector, and $u_r=\ddot{r}$ as the input.

Then, the state-space representation under continuous time duration can be converted into the state-space representation under discrete times by using the forward rectangular rule, as shown in the equations (23) and (24).

$$\hat{x}_{r,k+1}=\Phi_r \hat{x}_{r,k}+\Gamma_r u_{r,k}+G_r w_{r,k} \quad (23)$$

$$y_{r,k}=H_r x_{r,k} \quad (24)$$

Wherein, $x_{r,k}=[r_k \ \dot{r}_k]^T$, $\Gamma_r=G_r$, $w_{r,k}$ is the interference noise from the system, T is the sampling time, $y_{r,k}$ is the system output, $H_r=[1\ 0]$ is the output matrix, and $\Phi_r$ as well as $\Gamma_r$ are represented as the equation (25).

$$\Phi_r = \begin{bmatrix} 1 & T \\ 0 & 1 \end{bmatrix}, \Gamma_r = \begin{bmatrix} \frac{1}{2}T^2 \\ T \end{bmatrix} \quad (25)$$

Based on the foregoing motion model, Kalman filter is used along with the feedback gain matrix to perform the estimation under the closed loop state (since $u_{r,k}$ cannot be measured, here supposed as zero), as shown in equations (26) and (27).

$$\hat{x}_{r,k+1}=\Phi_r \hat{x}_{r,k}+L_r(y_{r,k}-\hat{y}_{r,k}) \quad (26)$$

$$y_{r,k}=H_r \hat{x}_{r,k} \quad (27)$$

Wherein, $x_r=[r_k \ \dot{r}_k]^T$ is estimated system state, $L_r$ is the feedback gain matrix.

The microprocessor 110 then, according to the summation of the current longitudinal force of the tires and the current longitudinal force $\hat{F}_{x,i}$ of each of the tires, allocates the summation of the current lateral forces to obtain the current lateral force $\hat{F}_{yi}$ of each of the tires, as shown in the step S160. The microprocessor 110 further obtains the maximum tire force $\hat{F}_{xi,max}$, $\hat{F}_{yi,max}$ (the maximum tire grip force) according to the current normal force of each of the tires and a coefficient of friction µ of the road relative to each of the tires, as shown in the step S170.

Last, the microprocessor 110 obtains the longitudinal tire force reserve $\Delta \hat{F}_{xi}$ of each of the tires and the lateral tire force reserve $\Delta \hat{F}_{yi}$ of each of the tires according to the maximum tire force $\hat{F}_{xi,max}$, $\hat{F}_{yi,max}$ of each of the tires, the current longitudinal force $\hat{F}_{x,i}$ of each of the tires and the current lateral force $\hat{F}_{yi}$ of each of the tires, as shown in the step S180.

Since the maximum tire force is limited by the coefficient of friction µ of the road relative to each of the tires, the estimation of the tire force reserve of each of the tires is performed using the relationship of the circle of friction between the current longitudinal force $\hat{F}_{x,i}$ of each of the tires and the current lateral force $\hat{F}_{yi}$ of each of the tires, as shown in the equations (28) and (29), and the maximum longitudinal tire force $\hat{F}_{xi,max}$ of each of the tires and the maximum lateral tire force $\hat{F}_{yi,max}$ of each of the tires can be obtained.

$$\hat{F}_{xi}^2+\hat{F}_{yi}^2 \leq \hat{\mu}_p^2 \hat{F}_{zi}^2 \quad (28)$$

$$\hat{F}_{xi,max}=\sqrt{\hat{\mu}_p^2 \hat{F}_{zi}^2-\hat{F}_{yi}^2}, \hat{F}_{yi,max}=\sqrt{\hat{\mu}_p^2 \hat{F}_{zi}^2-\hat{F}_{xi}^2} \quad (29)$$

Wherein, the symbol i respectively stands for the four tires fr, fl, rr and rl. $\hat{F}_{xi,max}$ is the maximum longitudinal tire force of each of the tires, and $\hat{F}_{yi,max}$ is the maximum lateral tire force of each of the tires.

Next, the maximum longitudinal tire force $\hat{F}_{xi,max}$ is subtracted by the current longitudinal force $\hat{F}_{x,i}$ to obtain the longitudinal tire force reserve $\Delta \hat{F}_{xi}$, and the maximum lateral tire force $\hat{F}_{yi,max}$ is subtracted by the current lateral force $\hat{F}_{yi}$ to obtain the lateral tire force reserve $\Delta \hat{F}_{yi}$.

$$\Delta \hat{F}_{xi}=\hat{F}_{xi,max}-\hat{F}_{x,i}, \Delta \hat{F}_{yi}=\hat{F}_{yi,max}-\hat{F}_{yi} \quad (30)$$

$\Delta \hat{F}_{xi}$ is the longitudinal tire force reserve of each of the tires, and $\Delta \hat{F}_{yi}$ is the lateral tire force reserve of each of the tires. $\mu_p$ is the maximum coefficient of friction of the road. The tire sideslip angle and the estimation for the self-aligning torque of the steering tires are used to calculate the time window of the tire sideslip angle and the estimated self-aligning torque, and the stateflow discriminant is used to determine the possible range of the maximum coefficient of friction of the road, and then the maximum coefficient of friction of the road is calculated. Alternatively, the maximum coefficient of friction of the road may be obtained from the database. For example, the maximum coefficient of friction of the road may be calculated according to the location and the weather of the place where the vehicle is located.

After the longitudinal tire force reserve $\Delta \hat{F}_{xi}$ of each of the tires and the lateral tire force reserve $\Delta \hat{F}_{yi}$ of each of the tires are obtained, the ADAS can intervene the driving manipulation of the vehicle to prevent the tire slipping in the longitudinal direction (tire idle) or to prevent the tire slipping in the lateral direction (tire drift). For example, the microprocessor may load a threshold value. When the longitudinal tire force reserve $\Delta\hat{F}_{xi}$ of each of the tires or the lateral tire force reserve $\Delta\hat{F}_{yi}$ of each of the tires is less than the threshold value, a tire slipping alarm is generated. The tire slipping alarm may be a notice showing information to the driver, and the driver can manipulate the vehicle to decrease the vehicle speed or to decrease the steering angle of the vehicle. Alternatively, the microprocessor 110 may intervene to brake or to allocate the vehicle power according to the tire slipping alarm. In the case of an automatic driving system, the automatic driving system amends the vehicle speed (especially the speed of the lateral movement of the vehicle between two lanes when the vehicle changes lane) and the planned route, according to the tire slipping alarm.

Figure 5:
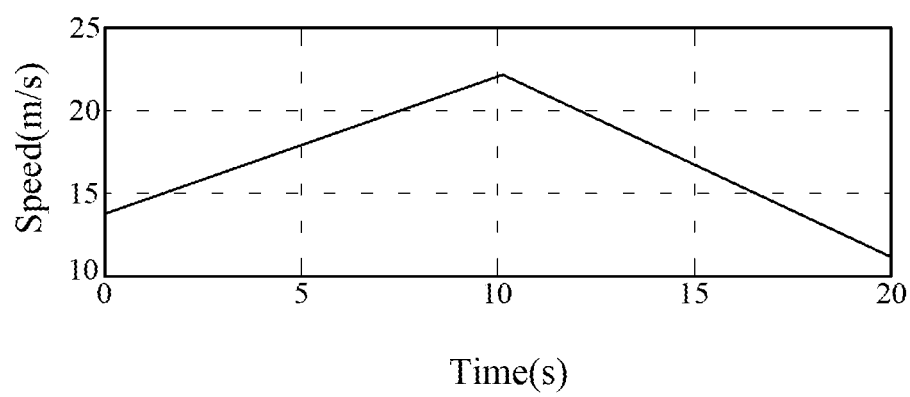
FIG. 5 illustrates a graph showing the speed change during the acceleration and deceleration of a vehicle.
Figure 6A:
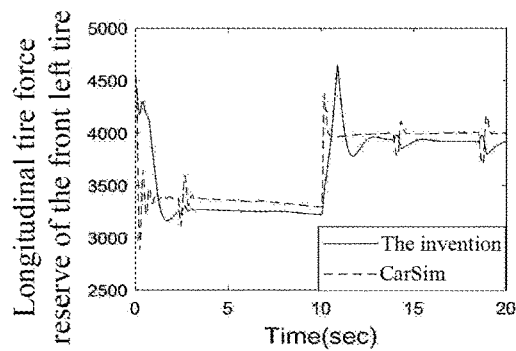
FIG. 6A illustrates a graph showing the longitudinal tire reserve force of the front left tire at different times under the scenario of FIG. 5.
Figure 6B:
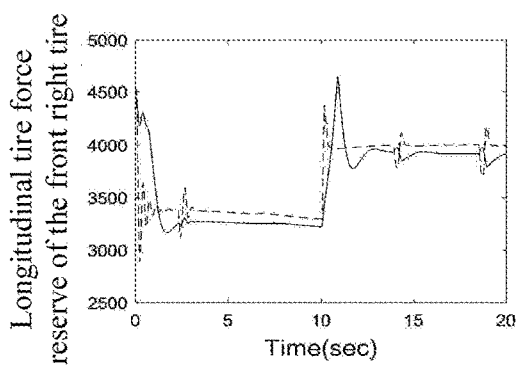
FIG. 6B illustrates a graph showing the longitudinal tire reserve force of the front right tire at different times under the scenario of FIG. 5.
Figure 6C:
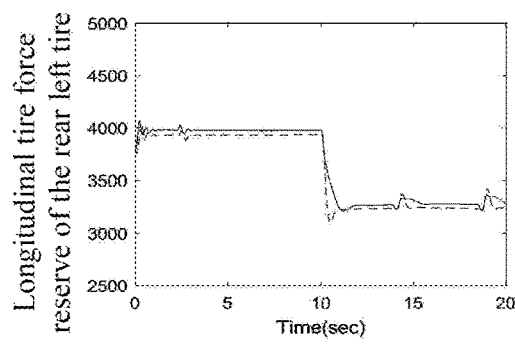
FIG. 6C illustrates a graph showing the longitudinal tire reserve force of the rear left tire at different times under the scenario of FIG. 5.
Figure 6D:
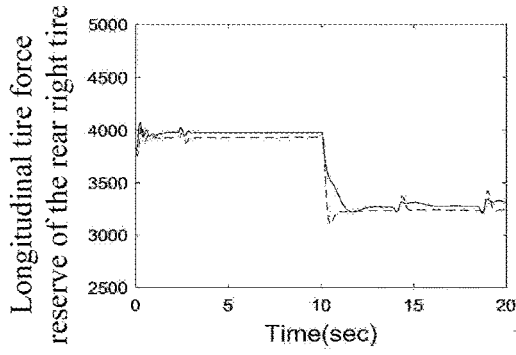
FIG. 6D illustrates a graph showing the longitudinal tire reserve force of the rear right tire at different times under the scenario of FIG. 5.
Figure 7A:
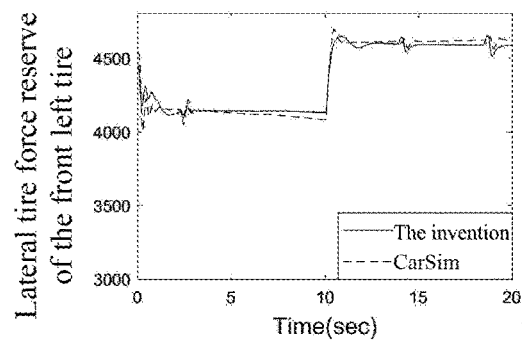
FIG. 7A illustrates a graph showing the lateral tire reserve force of the front left tire at different times under the scenario of FIG. 5.
Figure 7B:
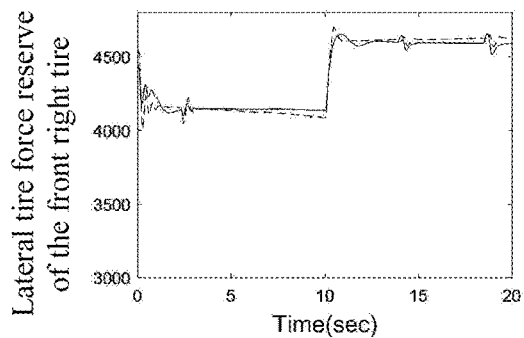
FIG. 7B illustrates a graph showing the lateral tire reserve force of the front right tire at different times under the scenario of FIG. 5.
Figure 7C:
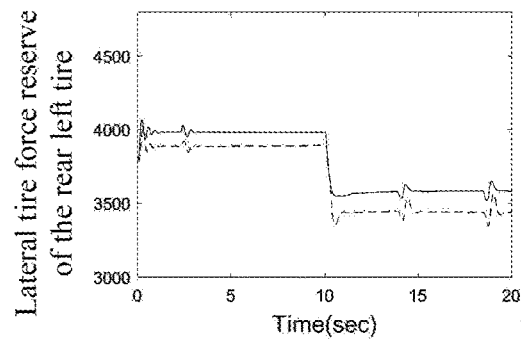
FIG. 7C illustrates a graph showing the lateral tire reserve force of the rear left tire at different times under the scenario of FIG. 5.
Figure 7D:
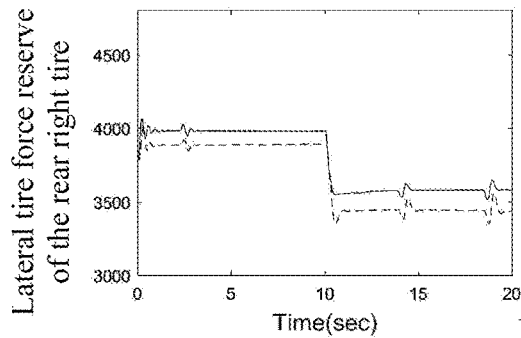
FIG. 7D illustrates a graph showing the lateral tire reserve force of the rear right tire at different times under the scenario of FIG. 5.
Figure 8:
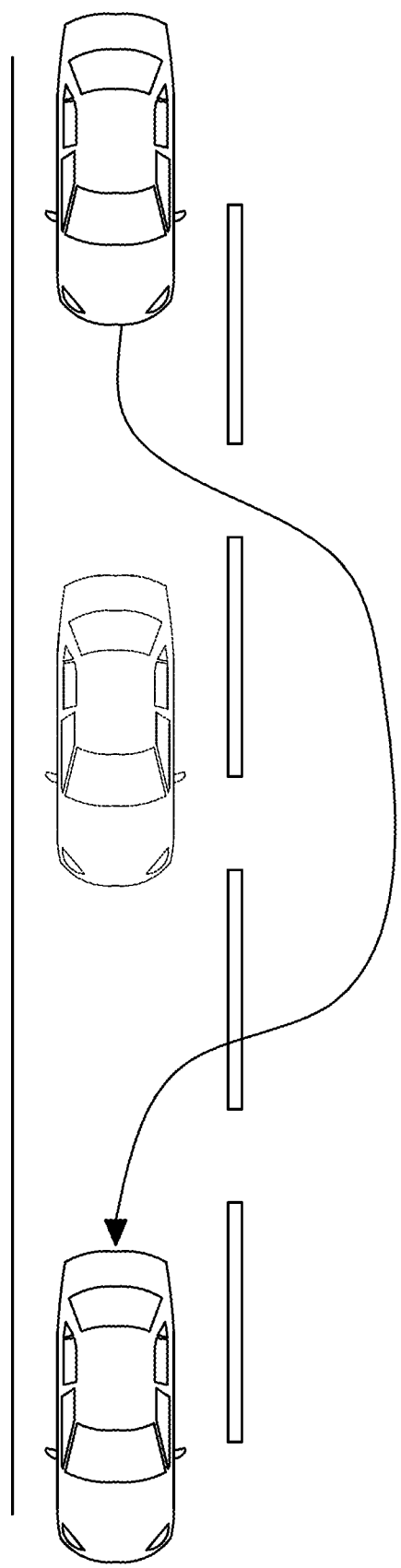
FIG. 8 illustrates a schematic view showing the lane change of a vehicle.
Figure 9A:
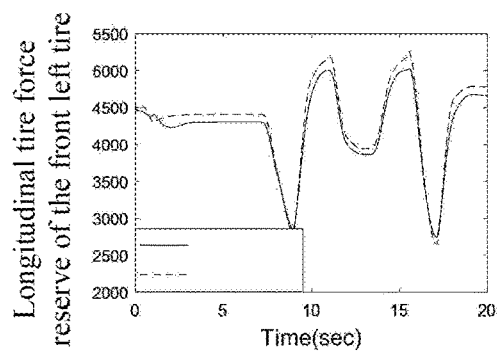
FIG. 9A illustrates a graph showing the longitudinal tire reserve force of the front left tire at different times under the scenario of FIG. 8.
Figure 9B:
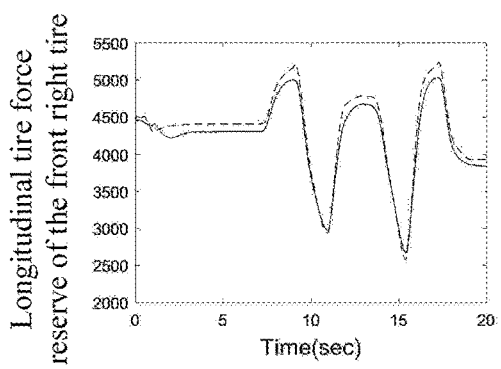
FIG. 9B illustrates a graph showing the longitudinal tire reserve force of the front right tire at different times under the scenario of FIG. 8.
Figure 9C:
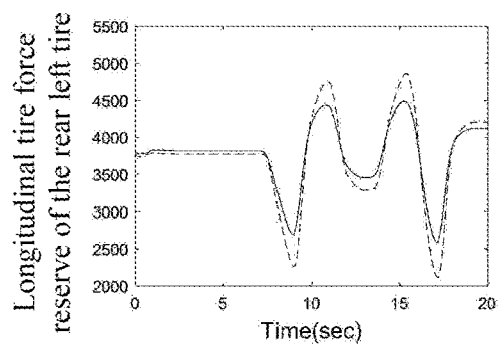
FIG. 9C illustrates a graph showing the longitudinal tire reserve force of the rear left tire at different times under the scenario of FIG. 8.
Figure 9D:
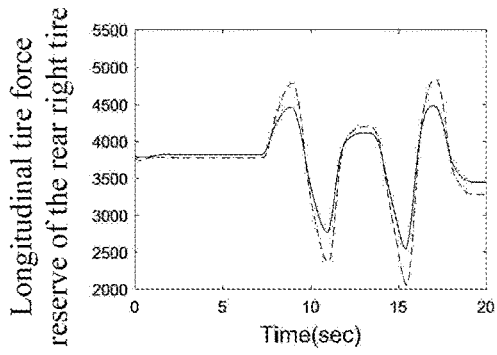
FIG. 9D illustrates a graph showing the longitudinal tire reserve force of the rear right tire at different times under the scenario of FIG. 8.
Figure 10A:
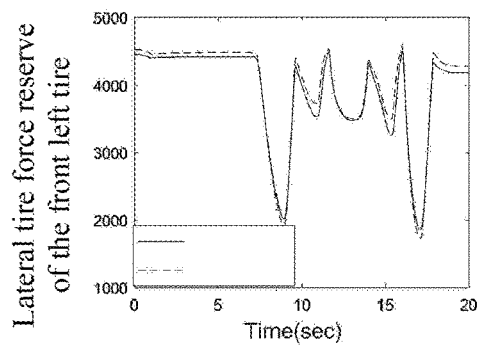
FIG. 10A illustrates a graph showing the lateral tire reserve force of the front left tire at different times under the scenario of FIG. 8.
Figure 10B:
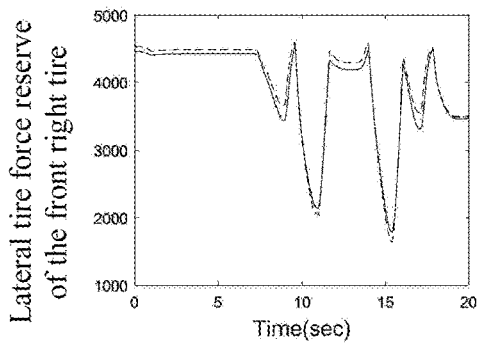
FIG. 10B illustrates a graph showing the lateral tire reserve force of the front right tire at different times under the scenario of FIG. 8.
Figure 10C:
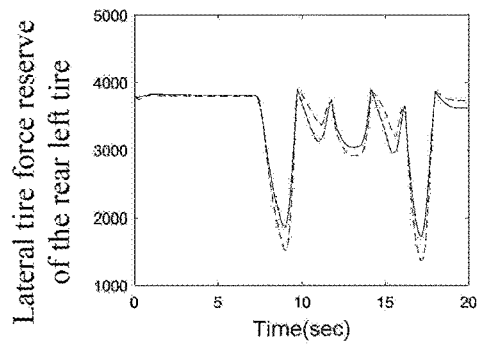
FIG. 10C illustrates a graph showing the lateral tire reserve force of the rear left tire at different times under the scenario of FIG. 8.
Figure 10D:
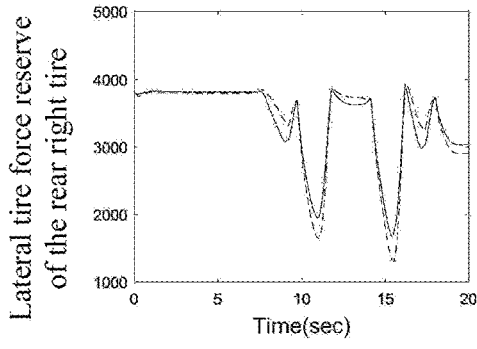
FIG. 10D illustrates a graph showing the lateral tire reserve force of the rear right tire at different times under the scenario of FIG. 8.

Please refer to FIGS. 4, 5, 6A to 6D and 7A to 7D, illustrating the comparisons between the method for tire force reserve estimation and the method performed by CarSim software (vehicle simulation analysis software) published by Mechanical Simulation, and the vehicle parameters used for the comparisons are presented as the table shown in FIG. 4. The first scenario of the simulation is the acceleration and deceleration of the vehicle in a straight line, and the change of the vehicle speed is shown in FIG. 5. In the scenario, the vehicle accelerates the speed with an initial speed of about 50 km/hr and then the vehicle decelerates the speed to 40 km/hr, wherein the symbol Vx shown in the figure indicates the vehicle speed per second (m/s).

As shown in FIGS. 6A to 6D, the front tires are driving tires, and the longitudinal tire force is consumed by the front tires during the acceleration process. Therefore, during the 10-second acceleration process, the longitudinal tire force reserves of the front tires decrease. On the other hand, during the 10-second deceleration process, an upward response is presented at the beginning of the deceleration, so that the tire force reserve suddenly increases to allow the increasing of the longitudinal tire force reserves of the front tires; then, the vehicle brakes to decrease the speed of each of the tires, so that the longitudinal tire forces are consumed again to decrease the longitudinal tire force reserves. Furthermore, as shown in FIGS. 7A to 7D, since the vehicle does not have lateral motions, the lateral tire force reserve is mainly affected by the vertical load transfer. During the acceleration process, the vertical load is transferred to the rear tires; on the other hand, during the deceleration process, the vertical load is transferred to the front tires. Hence, an obvious change of the lateral tire force reserve can be observed before and after the 10 seconds.

Please refer to FIGS. 8, 9A to 9D, and 10A to 10D. The second scenario of the simulation is the lane change of a vehicle for overtaking another vehicle. As shown in FIGS. 9A to 9D and 10A to 10D, during the 0 to 5 seconds, the vehicle performs a linear motion, thus the longitudinal tire force reserve $\Delta\hat{F}_{xi}$ of each of the tires and the lateral tire force reserve $\Delta\hat{F}_{yi}$ of each of the tires remain unchanged. Then, the vehicle starts steering, and the lateral tire force reserves $\Delta\hat{F}_{yi}$ of both the front tires and the rear tires change obviously. Further, because of the ratio relationship of the circle of friction, the longitudinal tire force reserve $\Delta\hat{F}_{xi}$ of each of the tires is also changed. Last, after the lane change of the vehicle is completed, the longitudinal tire force reserve $\Delta\hat{F}_{xi}$ of each of the tires and the lateral tire force reserve $\Delta\hat{F}_{yi}$ of each of the tires are recovered back to the initial state.

As above, according to one or some embodiments of the instant disclosure, the method for tire force reserve estimation can be utilized to estimate the longitudinal tire force reserve $\Delta\hat{F}_{xi}$ of each of the tires and the lateral tire force reserve $\Delta\hat{F}_{yi}$ of each of the tires in an effective manner. When the tire force reserve is not enough, the system can deliver the warning to the driver so that the driver can adjust the manipulation for the vehicle. Even more, this method allows the ADAS to intervene the manipulation of the vehicle before the vehicle tires slip, so that the driving safety can be improved effectively. The method for tire force reserve estimation can be further applied to an automatic driving system to estimate the driving strategy of the automatic driving system. Hence, the method can prevent the automatic driving system from making decisions that may cause tire slipping.

What is claimed is:

1. A method for tire force reserve estimation, applicable to estimate a tire force reserve of a vehicle, wherein the vehicle has a vehicle body mass, a center of gravity and a plurality of tires, and the plurality of tires comprise at least a pair of steering tires; a height is defined between the center of gravity and a road, a rolling direction of the each of the tires is defined as a longitudinal direction, and a direction perpendicular to the rolling direction on a horizontal plane is defined as a lateral direction; the method for tire force reserve estimation comprises:

obtaining an initial normal force of each of the tires to the road;

obtaining a longitudinal load transfer of each of the tires and a lateral load transfer of each of the tires according to a longitudinal acceleration of the vehicle, a lateral acceleration of the vehicle, the vehicle body mass, a tire mass of each of the tires and a relative position between each of the tires and the center of gravity;

correcting the initial normal force of each of the tires according to the longitudinal load transfer of each of the tires and the lateral load transfer of each of the tires to obtain a current normal force of each of the tires;

obtaining a current longitudinal force of each of the tires according to a tire rotational speed of each of the tires, a tire torque of each of the tires, an effective rolling radius of each of the tires, a moment of inertia of each of the tires and time rate of change of tire rotation angles of each of the tires;

obtaining an overall lateral force of the plurality of tires of the vehicle according to the lateral acceleration of the vehicle, a yaw acceleration of the vehicle, a steering angle of each of the steering tires relative to the longitudinal direction, the current longitudinal force of each of the tires and the current normal force of each of the tires;

allocating the overall lateral force to obtain a current lateral force of each of the tires;

obtaining a maximum tire force of each of the tires according to the current normal force of each of the tires and the coefficient of friction of the road relative to each of the tires and obtaining a longitudinal tire force reserve of each of the tires and a lateral tire force reserve of each of the tires according to the maximum tire force of each of the tires, the current longitudinal force of each of the tires and the current lateral force of each of the tires;

generating a tire slip alarm by a microprocessor when the longitudinal tire force reserve of each of the tires or the lateral tire force reserve of each of the tires is less than a threshold value; and allocating the vehicle power according to the tire slipping alarm by the microprocessor and amending the vehicle speed and the planned route according to the tire slipping alarm by an automatic driving system.

2. The method for tire force reserve estimation according to claim 1, wherein the initial normal force is stored in a storage device.

3. The method for tire force reserve estimation according to claim 1, wherein the step of obtaining the initial normal force of each of the tires to the road comprises obtaining the initial normal force of each of the tires to the road according to the vehicle body mass and the relative position between the tires and the center of gravity.

4. The method for tire force reserve estimation according to claim 3, wherein the initial normal force is stored in a storage device.

5. The method for tire force reserve estimation according to claim 1, where in the relative position between the tires and center of gravity comprises a distance between a front shaft of the vehicle and a rear shaft of the vehicle, a distance between the center of gravity and the front shaft and a distance between the center of gravity and the rear shaft.

6. The method for tire force reserve estimation according to claim 1, wherein the time rate of change of tire rotation angles comprises a tire angular acceleration.

7. The method for tire force reserve estimation according to claim 6, wherein the tire torque comprises a brake torque and a drive torque.

8. The method for tire force reserve estimation according to claim 1, wherein the maximum tire force comprises a maximum longitudinal tire force and a maximum lateral tire force.

9. The method for tire force reserve estimation according to claim 8, wherein the step of obtaining the longitudinal tire force reserve of each of the tires and the lateral tire force reserve of each of the tires comprises:

subtracting the maximum longitudinal tire force by the current longitudinal force to obtain the longitudinal tire force reserve; and subtracting the maximum lateral tire force by the current lateral force to obtain the lateral tire force reserve.

* * * * *